(12) United States Patent
Lewis et al.

(10) Patent No.: US 6,718,438 B2
(45) Date of Patent: Apr. 6, 2004

(54) USING FEEDBACK TO DETERMINE THE SIZE OF AN OBJECT CACHE

(75) Inventors: Brian T. Lewis, Palo Alto, CA (US); Bernd J. W. Mathiske, Santa Clara, CA (US); Neal M. Gafter, San Jose, CA (US); Michael J. Jordan, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 581 days.

(21) Appl. No.: 09/737,237

(22) Filed: Dec. 13, 2000

(65) Prior Publication Data

US 2002/0073283 A1 Jun. 13, 2002

(51) Int. Cl.[7] .............................................. G06F 12/08
(52) U.S. Cl. ..................... 711/129; 711/133; 711/173
(58) Field of Search ................... 711/179, 133, 711/129

(56) References Cited

U.S. PATENT DOCUMENTS 6,351,724 B1 * 2/2002 Klassen et al. ............. 702/186

OTHER PUBLICATIONS

Oracle Call Interface Programmer's Guide, vols. 1 & 2, Release 8.0 (A58234-01). Oracle Corporation, Dec. 1997 [retrieved Sep. 12, 2003]. Chapter. 11. Retrieved from <URL: http://alexander.pmf.ukim.edu.mk/oracledocs/app-dev.804/a58234/obj_cach.htm.*

* cited by examiner

*Primary Examiner*—Reginald G. Bragdon
(74) *Attorney, Agent, or Firm*—Park, Vaughan & Fleming LLP (57) ABSTRACT

The present invention uses feedback to determine the size of an object cache. The size of the cache, (i.e., its budget), varies and is determined based on feedback from the persistent object system. Persistent objects are evicted from the cache if the storage for persistent objects exceeds the budget. If the storage is less than the budget then persistent objects in the heap are retained while new persistent objects are added to the cache.

24 Claims, 7 Drawing Sheets

USING FEEDBACK TO DETERMINE THE SIZE OF AN OBJECT CACHE

BACKGROUND OF THE INVENTION

1. Field of the Invention

The present invention relates to persistent object systems, and in particular to sizing an object cache using feedback from the execution of a persistent object system.

Sun, Sun Microsystems, the Sun logo, Solaris, Java and all Java-based trademarks and logos are trademarks or registered trademarks of Sun Microsystems, Inc. in the United States and other countries. All SPARC trademarks are used under license and are trademarks of SPARC International, Inc. in the United States and other countries. Products bearing SPARC trademarks are based upon an architecture developed by Sun Microsystems, Inc. Gemstone/J is a trademark or registered trademark of GemStone Systems Inc. in the United States and other countries. Motorola and 680X0 are trademarks or registered trademarks of Motorola Inc in the United States and other countries. Intel, 80X86, and Pentium are trademarks or registered trademarks of Intel Corporation in the United States and other countries.

2. Background Art

Persistent object systems are designed to handle data that continues to exist, even after the process that created it has stopped executing. In contrast, transient object systems are designed to handle data only during the execution of the process that created the object. A heap is an area of memory reserved for objects that are created at runtime—that is, when the program actually executes. The persistent object system provides the illusion of a very large object heap because it is not limited only to objects that are created at runtime. Instead, a persistent object system may operate on both transient objects and persistent objects which are automatically backed up by secondary storage. The persistent objects may be stored in memory separately from transient objects or may be stored together in the heap.

Persistent objects are automatically saved to secondary storage, typically a stable storage medium such as a disk drive, and fetched from secondary storage into virtual memory on demand. The persistent object system implements automatic secondary storage management. Objects are accessed uniformly in virtual memory, regardless of whether they are transient or persistent. Persistent objects are written to storage when the program performs a "checkpoint. " A checkpoint is a snapshot of the state of the object at that moment in time. A complete description of one embodiment of a checkpointing scheme is described in co-pending U.S. patent application entitled "Method and Apparatus for Hybrid Checkpointing" Ser. No. 09/652,217 filed on Aug. 31, 2000, now U.S. Pat. No. 6,275,443, issued Aug. 14, 2001, assigned to the assignee of the present application, and hereby fully incorporated into the present application by reference. Objects are automatically read (faulted in) from the store when the program refers to them. This allows a long lived program's computation to survive in stable storage, across multiple executions, and despite system failures. An example of a persistent object platform is described below.

Persistent Object Platform

Figure 1:
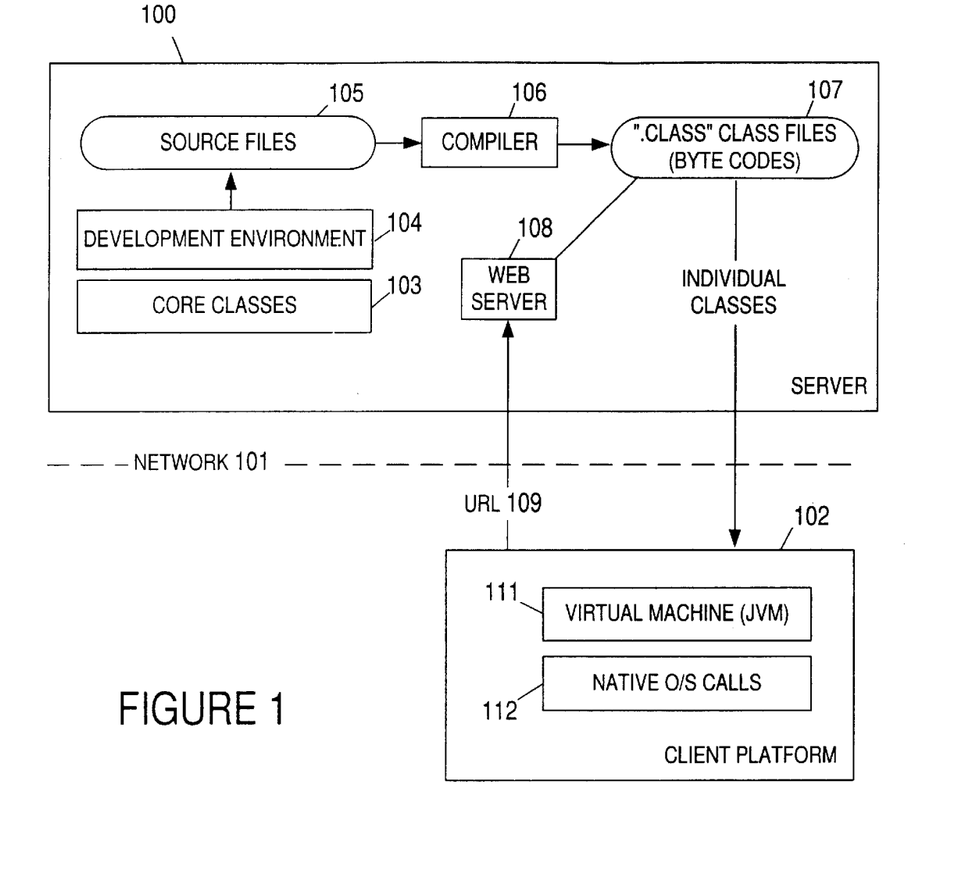
FIG. 1 is an embodiment of a network application environment.

An example of a persistent object platform is one that implements the Java platform. A program which utilizes Java technology is composed of a number of classes and interfaces. Unlike many programming languages, in which a program is compiled into machine-dependent, executable program code, programs which utilize Java technology are compiled into machine independent bytecode class files. Each class contains code and data in a platform-independent format called the class file format. The computer system acting as the execution vehicle contains a program called a virtual machine, which is responsible for executing the code in classes. The virtual machine provides a level of abstraction between the machine independence of the bytecode classes and the machine-dependent instruction set of the underlying computer hardware. FIG. 1 is a block diagram illustrating a sample network application environment, for instance a Java network application environment, comprising a client platform 102 coupled over a network 101 to a server 100 for the purpose of accessing class files for execution of an application or applet.

Sample Network Application Environment

In FIG. 1, server 100 comprises development environment 104 for use in creating the class files for a given application. The development environment 104 provides a mechanism, such as an editor and an applet viewer, for generating class files and previewing applets. A set of core classes 103 comprise a library of classes that can be referenced by source files containing other classes. From development environment 104, one or more source files 105 are generated. Source files 105 contain the programmer readable class definitions, including data structures, method implementations and references to other classes. Source files 105 are provided to compiler 106, which compiles source files 105 into compiled ".class" files 107 that contain bytecodes executable by a virtual machine. Bytecode class files 107 are stored (e.g., in temporary or permanent storage) on server 100, and are available for download over network 101.

Client platform 102 contains a virtual machine (VM) 111 which, through the use of available native operating system (O/S) calls 112, is able to execute bytecode class files and execute native O/S calls when necessary during execution. Class files are often identified in applet tags within an HTML (hypertext markup language) document. A web server application 108 is executed on server 100 to respond to HTTP (hypertext transport protocol) requests containing URLs (universal resource locators) to HTML documents, also referred to as "web pages." When a browser application executing on client platform 102 requests an HTML document, such as by forwarding URL 109 to web server 108, the browser automatically initiates the download of the class files 107 identified in the applet tag of the HTML document. Class files 107 are typically downloaded from the server and loaded into virtual machine 111 individually as needed.

It is typical for the classes of a program to be loaded as late during the program's execution as possible; they are loaded on demand from the network (stored on a server), or from a local file system, when first referenced during the program's execution. The virtual machine locates and loads each class file, parses the class file format, allocates memory for the class's various components, and links the class with other already loaded classes. This process makes the code in the class readily executable by the virtual machine.

Object Cache Management

Objects read from stable storage into virtual memory ("persistent objects") are stored in an "object cache". In general, caches are implemented under the assumption that it is very likely that some object or piece of data will be repeatedly accessed. Access delays are minimized by keeping popular data close to the entity which needs it. A cache comprises a finite area of a computer's memory and, as stated above, can be combined to contain both transient and persistent objects. Thus, the total space for all memory-resident persistent objects may exceed some proportion of the total cache size, called a "budget". When the persistent objects in the cache exceed the size of the budget they must be removed from the cache. Removing such objects from the cache is termed "eviction". Once an object is evicted, it must be read from the store the next time it is needed. Thus, it is important to try to not evict objects that are likely to be used again in the near future. Current eviction schemes are inadequate at determining whether an object marked for eviction is likely to be used in the near future.

Current Schemes for Managing the Object Cache

Using current schemes, a persistent object system's object cache is implemented either by using a combined heap (i.e., combining the heap with the object cache) or by using a separate storage area. Using a combined heap and object cache is a simpler implementation because a garbage collector can treat persistent objects like other heap objects. Garbage collection is a part of a language's runtime system, or an add-on library, perhaps assisted by the compiler, the hardware, the operating system, or any combination of the three. The garbage collector automatically determines what memory a program is no longer using, and recycles it for other use. When an object is evicted, references to that object can be updated using the same mechanisms that the garbage collector uses to update references after a garbage collection. Also, unused space in the object cache can be used in the heap, and vice-versa.

On the other hand, using a separate object cache allows persistent objects to be managed separately from transient objects. It allows eviction to be done independently from garbage collection. However, a separate object cache is a more difficult implementation, since the heap will now contain references to a separate storage area, (the object cache), and the garbage collector must be modified to scan those references correctly. When objects are evicted, references to those objects must be updated, and it may not be possible to reuse garbage collector code to do this. If the garbage collection is not exact—that is, if it does not have exact information about the location of every object—eviction will be harder to implement since it will not be possible to move some objects.

In the prior art, some work has been done on eviction, and several strategies have been used. These strategies include: total eviction, second chance eviction, random eviction, clock-based eviction, and partition-based eviction. In the total eviction scheme, all persistent objects are evicted. In the second chance eviction scheme, at each garbage collection, objects are marked which are likely to need eviction soon and then given a second chance. If the marked objects are not referenced at the next garbage collection, they are evicted. In the random eviction scheme, some percentage of objects are evicted in a random fashion. In the clock-based eviction scheme, objects kept longest in the cache are evicted first. In the partition-based eviction scheme, the object cache is divided into partitions and when eviction is needed, some objects in a partition are evicted. Objects within a partition maybe selected using a second chance strategy, a clock scheme, or some other strategy.

Each strategy differs in how well it evicts objects not likely to be used again in the near future. For example, since total eviction evicts all persistent objects, it tends to perform poorly because it evicts all objects regardless of whether or not they might be needed later. In a total eviction scheme, the evicted objects often need to be accessed again in the near future. This means the objects must be faulted in again from storage. Faulting the object in causes a penalty associated with input and output operations. Second chance eviction performs better than total eviction because it keeps the most recently used objects in the hope that they will be used again. However, second chance eviction may evict too many objects if, for example, the time period chosen is too short and it evicts objects that the program will soon need again.

Random and clock-based eviction both have the trouble that they often evict objects that will be needed soon. Partition-based eviction tends to perform well because it minimizes the number of objects evicted (since only one partition is considered for eviction), and so it retains more objects including those that might be needed again. Furthermore, the objects in the partition having potentially evicted objects can be selected by second chance (or another scheme) that increases the chances of choosing the correct objects to evict.

The various strategies differ in how difficult they are to implement. Random and total eviction are easy to implement. Second chance eviction is only slightly more difficult to implement than random and total eviction. These schemes can easily be implemented in an object cache that is either combined with or separate from the heap. Partition-based eviction is much more difficult to implement. Current partition-based schemes require a separate object cache, and the difficulties implementing this were described above. Using a separate object cache also has the drawback that unused space in the object cache cannot be used by the heap and vice-versa.

One example of a partition-based scheme is Gemstone/J. Gemstone/J implements persistence in the Java technology platform by using a modified version of the Java Hot-Spot performance engine. The separate object cache is called a persistent object memory (POM) and is divided up into partitions. When the POM fills up, the oldest region is garbage collected and reused. In Gemstone/J the size of the POM is fixed: it cannot be varied during a program's execution based on the behavior and needs of the program. This is disadvantageous because the behavior and needs of different programs and even the same program at different times vary dramatically.

In summary, different schemes have been used to implement and manage object caches. Object caches have been combined with the heap or have used a separate storage area. A number of eviction strategies have been used that differ in how effective they are in keeping objects in the cache that are likely to be used again in the near future. However, all current object cache implementations are fixed size. They do not increase in size when the system needs to keep more persistent objects in memory, and do not shrink when the system needs memory for more important activities. What is needed is a mechanism that enables object caches to grow or shrink according to the requirements of the rest of the persistent object system.

SUMMARY OF THE INVENTION

The present invention uses feedback to determine the size of an object cache. The size of the cache, (i.e., its budget), varies and is determined based on feedback from the persistent object system. Persistent objects are evicted from the cache if the storage for persistent objects exceeds the budget. If the storage is less than the budget then persistent objects in the heap are retained while new persistent objects are added to the cache.

One embodiment increases the budget when the feedback indicates that the rate at which persistent objects are being faulted in is high. Another embodiment decreases the budget when the feedback indicates that the rate at which transient objects are being allocated is high. Another embodiment decreases the budget when the feedback indicates that the rate of garbage collection is high.

Using the budget to partition the object cache between transient and persistent objects, various schemes are applied to reduce the number of persistent objects through eviction until the number of persistent objects equals the budget. One embodiment uses a second chance tagging scheme. Another embodiment uses a random eviction scheme. In this way, the present invention utilizes feedback to approximate a solution to the problems associated with attempting to evict only the most necessary persistent objects from the object cache. In one embodiment, the object cache is combined with the heap. In another embodiment, the heap and object cache remain separated.

BRIEF DESCRIPTION OF THE DRAWINGS

These and other features, aspects and advantages of the present invention will become better understood with regard to the following description, appended claims and accompanying drawings where:

DETAILED DESCRIPTION OF THE INVENTION

The invention uses feedback to determine the size of an object cache. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

The present invention allows the amount of persistent objects in the object cache to grow or shrink based on feedback from other parts of the system. It offers the advantages of partition-based eviction of some unnecessary objects but retention of most objects. It adds to these the ability to adapt its size to the needs of the persistent system: to use less storage if other parts of the system need more storage, and to use more storage if more persistent objects are needed in memory. The amount of storage for persistent objects allowed to reside in the objects cache refers to the "budget."

According to one embodiment of the present invention, the heap and object cache are combined. In another embodiment, the heap and object cache are separate. Persistent objects occupy up to a certain percentage of the object cache (the budget). When eviction is necessary, persistent objects are evicted until the total persistent object storage falls below the budgeted amount. The invention keeps more persistent objects in memory than current schemes, which is advantageous, because there is a cost associated with faulting an object in from disk to memory. In one embodiment, objects are marked to be retained by use of a breadth-first scan starting from the persistent root objects. Eviction may be performed, for instance, during an old space garbage collection in a generational heap, during a single space garbage collection, or any other time in the garbage collection process as well.

Figure 2:
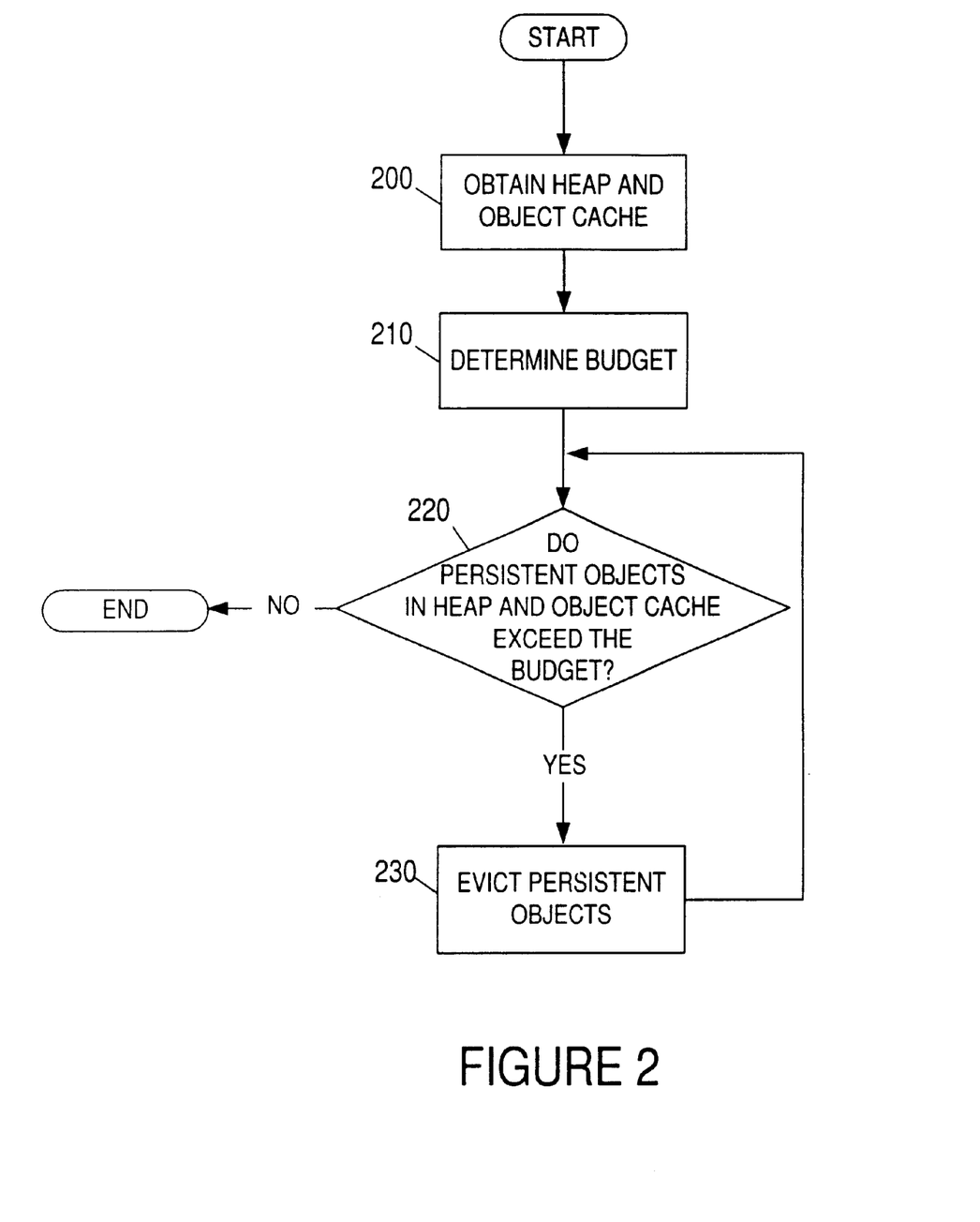
FIG. 2 is a flowchart of object cache eviction using a variable budget in accordance with an embodiment of the present invention.

The invention operates in accordance with FIG. 2, which provides a flowchart of object cache eviction using a variable budget. At step 200, the heap and object cache are obtained. In this step, the heap and object cache may be combined or they may remain separate. Next, at step 210, a budget is determined. At step 220, it is determined whether the persistent objects in the heap and object cache exceed the budget. If they do not, then no eviction is needed and the algorithm is complete. If the persistent objects do exceed the budget, then the persistent objects are evicted at step 230 until their size in the heap and object cache no longer exceed the budget.

Figure 3:
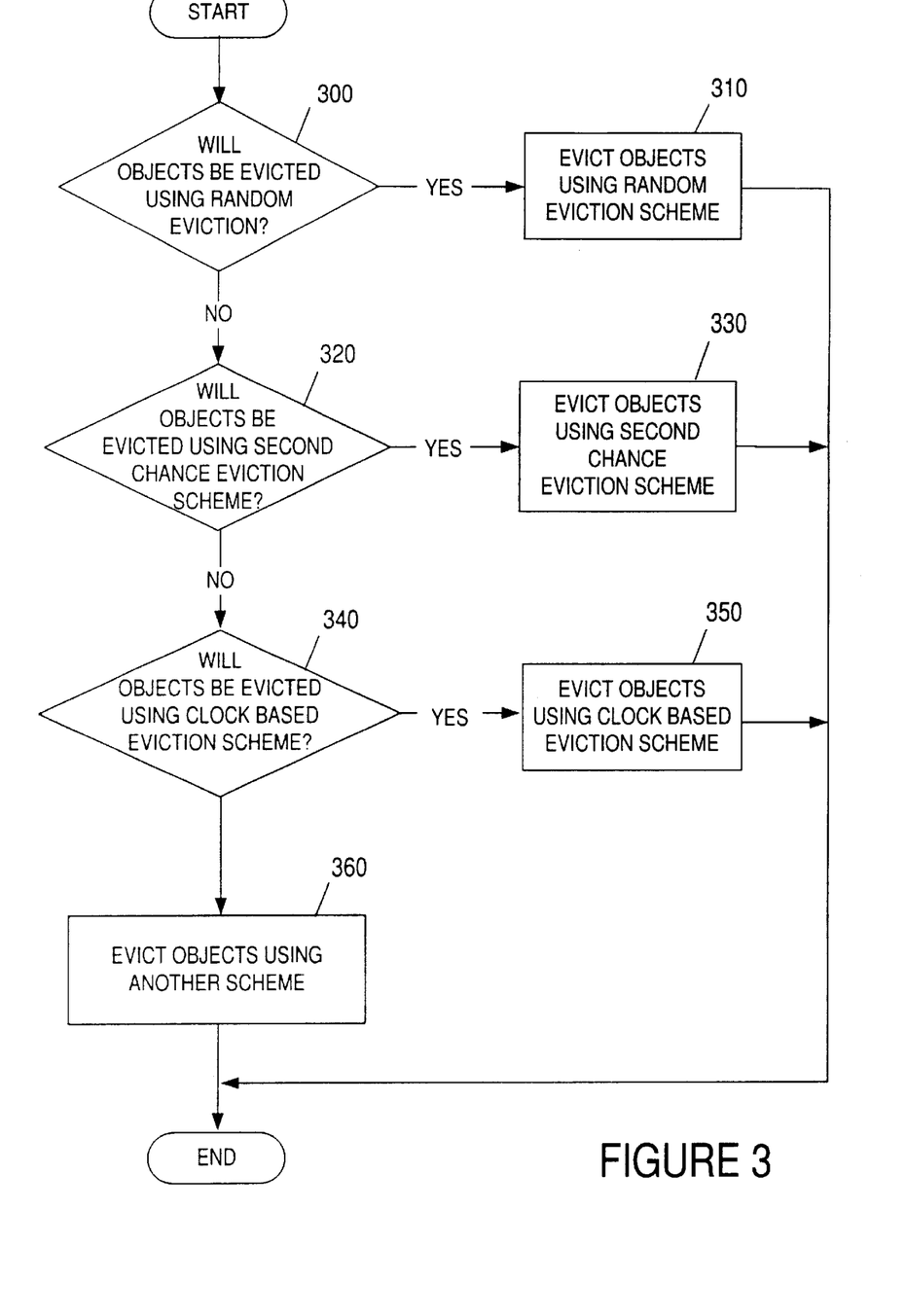
FIG. 3 is a flowchart for determining the appropriate eviction scheme in accordance with an embodiment of the present invention.

The eviction at step 230 can use a number of different schemes. FIG. 3 provides a flowchart for determining the appropriate eviction scheme in accordance with an embodiment of the present invention. At step 300, it is determined whether a random eviction will be used to evict persistent objects from the object cache. If random eviction will be used, then persistent objects are evicted from the object cache at step 310. If random eviction will not be used at step 300, it is determined at step 320 whether a second chance eviction scheme will be used to evict persistent objects. If a second chance scheme will be used, then persistent objects are evicted using the second chance scheme at step 330. If, on the other hand, second chance eviction will not be used at step 320, then at step 340, it is determined whether a clock based eviction scheme will be used. If a clock based eviction scheme will be used, then at step 350, the persistent objects are evicted using the clock based scheme. Otherwise, another scheme is used at step 360 to evict the persistent objects from the object cache.

Figure 4:
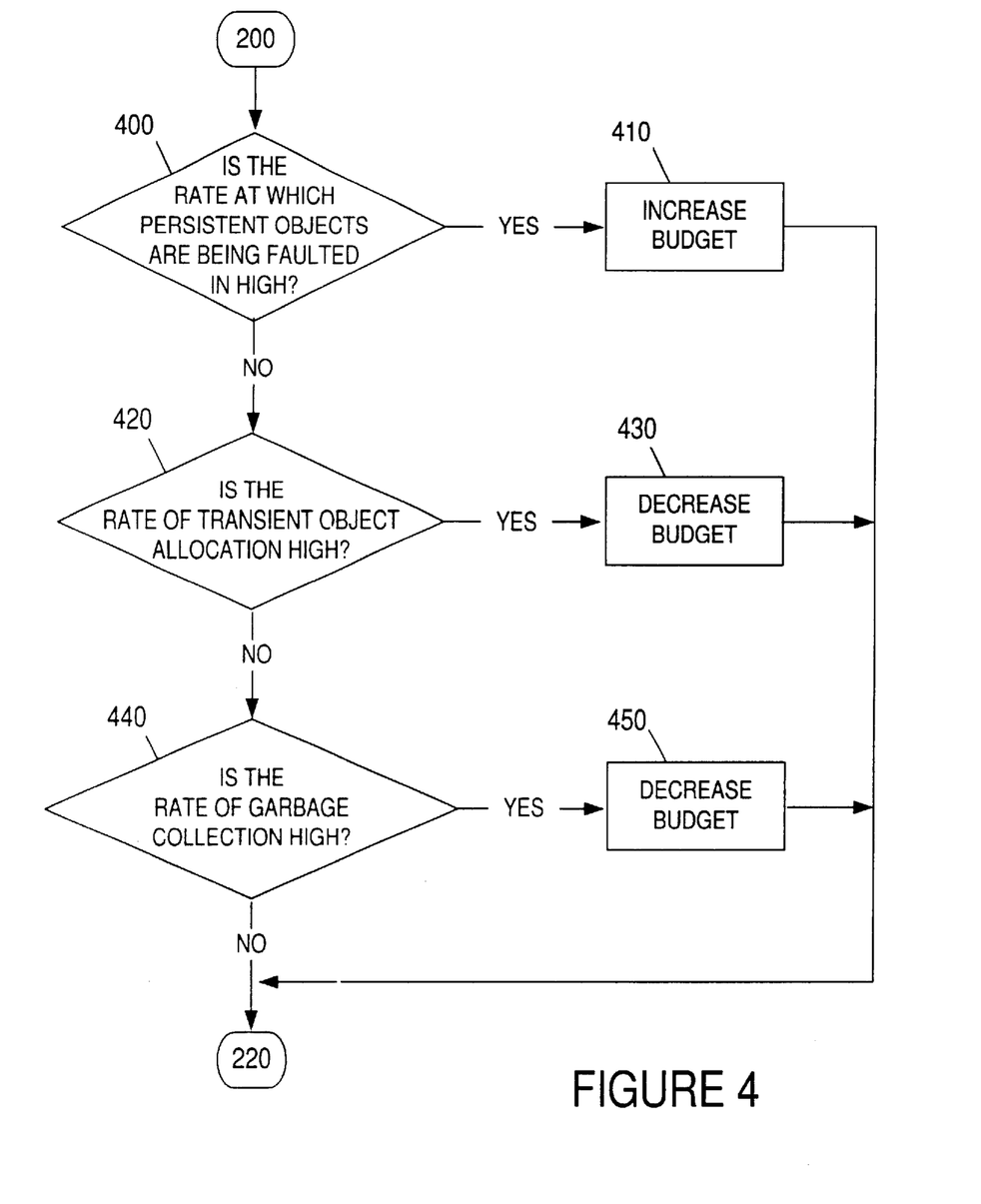
FIG. 4 is a flowchart for determining a variable budget in accordance with an embodiment of the present invention.

The budget of the present invention is a variable budget. The budget is based on feedback from other parts of the persistent object system. The manner in which the budget is determined is shown in the flowchart of FIG. 4. At step 400, it is determined whether the rate at which persistent objects are being faulted in is high. If the rate per a given time unit at which objects are being faulted in is high (i.e., more space is needed for persistent objects), the budget is increased at step 410. The rate being determined to be high can depend not only on the number of persistent objects being faulted in per time unit but also on the proportion between the sizes of the persistent objects being faulted in versus the size of the heap and object cache. Thus, the size of the budget is roughly proportional to the rate at which persistent objects are being faulted in to the heap and object cache.

If, at step 400, the rate at which persistent objects are being faulted in is not high, then it is determined if the rate of transient object allocation is high at step 420 (i.e., more space is needed for transient objects). If it is, the budget is decreased at step 430. The rate being determined to be high can depend not only on the number of transient objects being allocated per time unit but also on the proportion between the sizes of the transient objects being allocated versus the size of the heap and object cache. Thus, the rate of transient object allocation is inversely proportional to the size of the budget. If the rate of transient object allocation is not high at step 420, it is determined if the rate of garbage collection is high at step 440 (i.e., memory usage is high). If it is the budget is decreased at step 450. Thus, the size of the budget is inversely proportional to the rate of the garbage collection.

Figure 5:
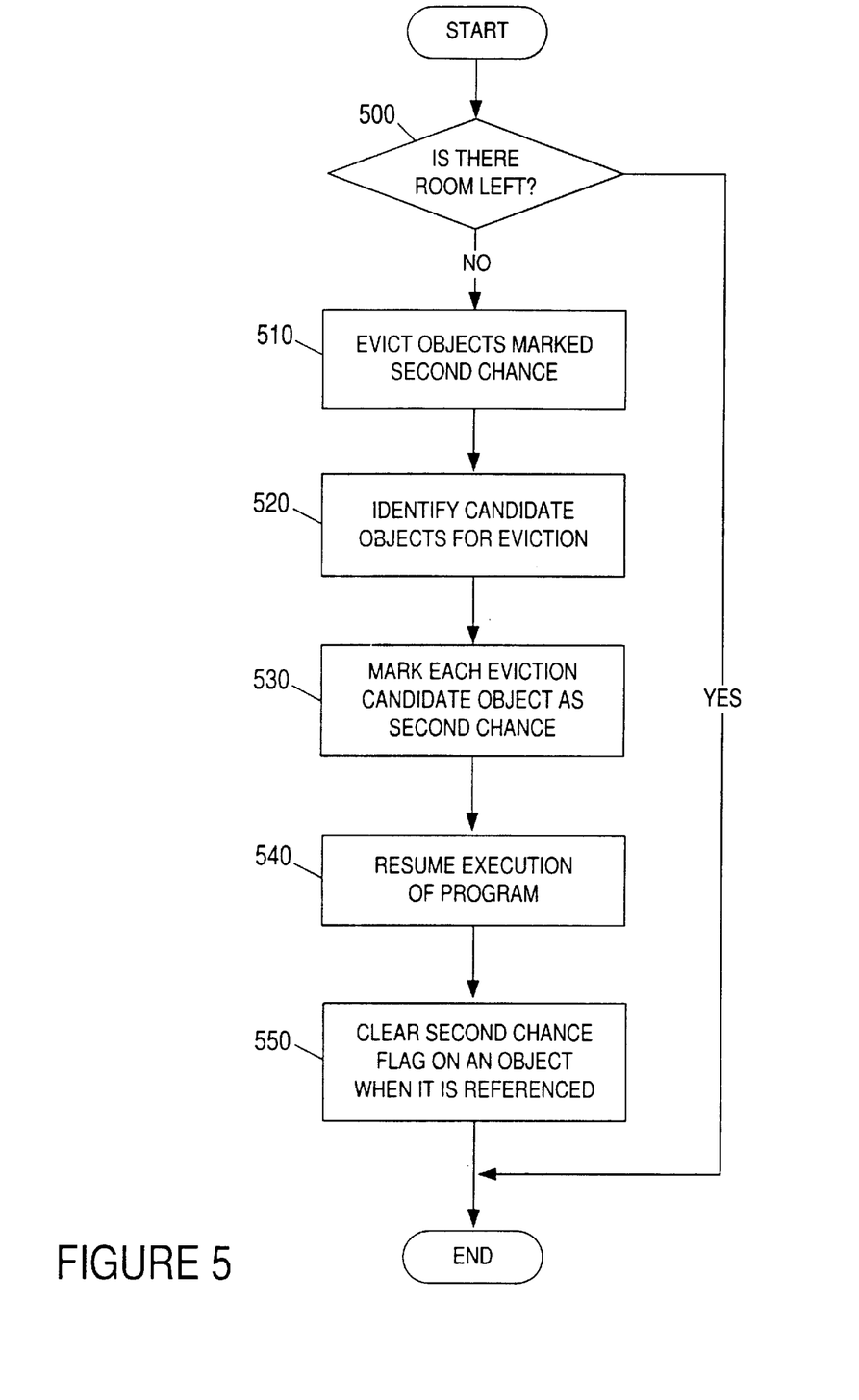
FIG. 5 is a flowchart of object cache eviction using a variable budget in accordance with an embodiment of the present invention.

In one embodiment of the present invention, when objects are evicted (step 230 of FIG. 2) a second chance eviction scheme is used. FIG. 5 provides a flowchart where a second chance tagging scheme is used to detect which objects have been referenced since the last eviction. First, at step 500, it is determined if there is room left. If there is room left, no objects are evicted and the algorithm terminates. Otherwise, objects marked as second chance are evicted (step 510). Then, at step 520 candidate objects for eviction are identified. Then at step 530, each eviction candidate object is marked as second chance. Thereafter, the program execution is resumed at step 540 and the second chance flags of objects are cleared when referenced at step 550.

Figure 6:
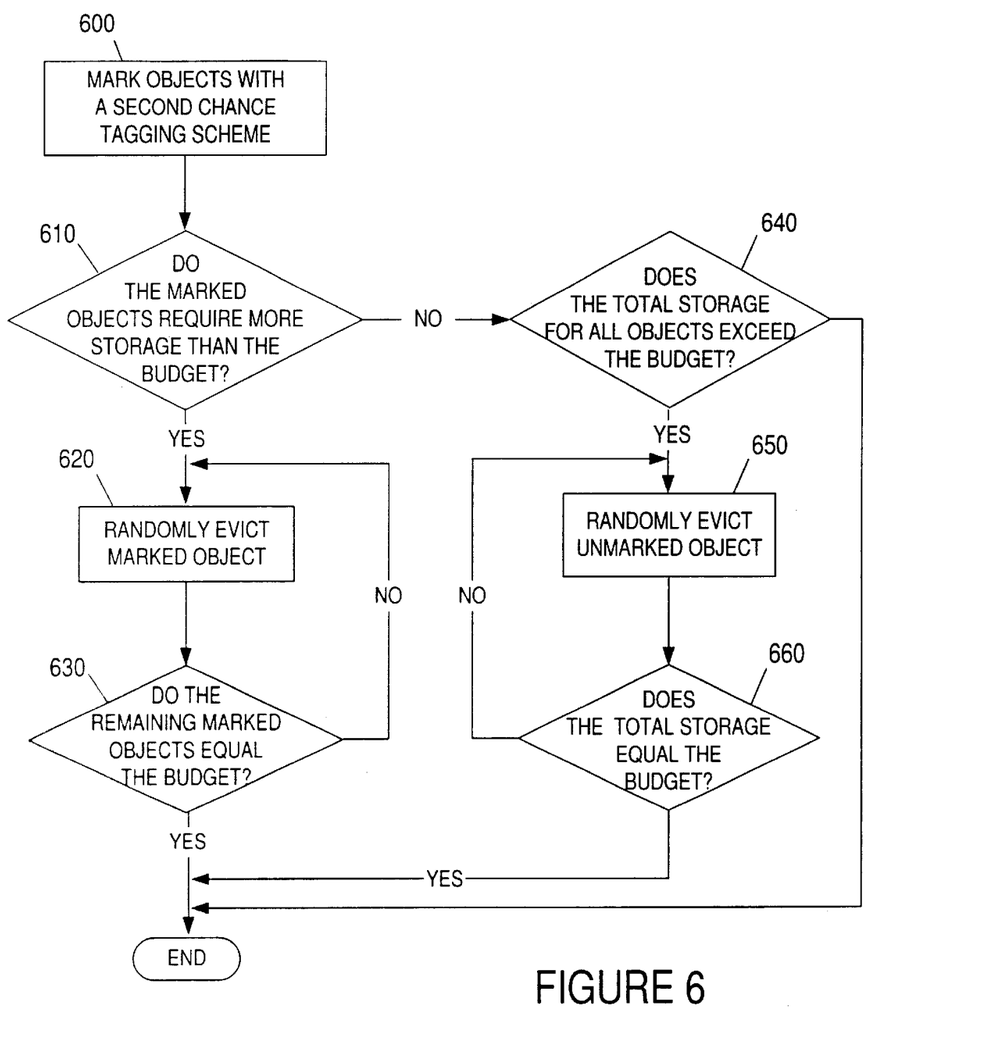
FIG. 6 is a flowchart of object cache eviction using a variable budget in accordance with an embodiment of the present invention.

Another embodiment of the present invention randomly selects objects to evict until the total persistent object storage is less than the budget. This embodiment of the invention is represented by FIG. 6. First, at step 600, a second chance tagging scheme marks objects and is used to decide which objects should be kept. Next, at step 610, it is determined whether the objects marked by the second chance scheme require more storage than the budget. If the marked objects do require more storage than the budget, one of the objects is randomly evicted at step 620. Thereafter, at step 630, if the total storage equals the budget, the algorithm is complete. Otherwise, objects continue to be evicted at step 620.

On the other hand, if at step 610 the second chance objects do not require more than the budgeted storage, it is determined at step 640 if the total storage exceeds the budget. If the total storage for all persistent objects exceeds the budget, an unmarked object is randomly evicted at step 650. Next, at step 660, it is determined if the total storage equals the budget. If it does not (i.e., total storage still exceeds the budget), unmarked objects continue to be evicted at step 650. Otherwise, the algorithm is complete. This embodiment is designed to perform quickly because it does not require traversals.

Embodiment of Computer Execution Environment (Hardware)

Figure 7:
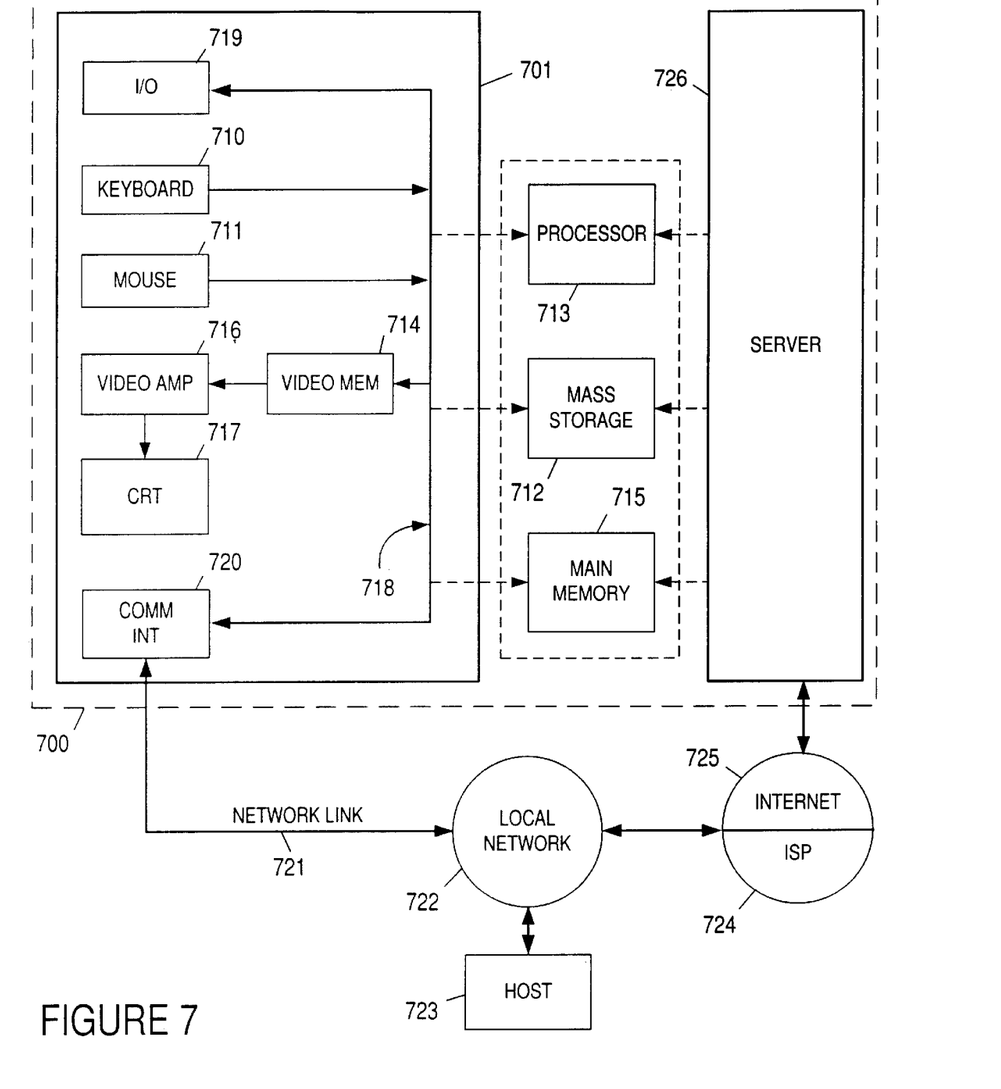
FIG. 7 is a block diagram of an embodiment of a computer system capable of providing a suitable execution environment for an embodiment of the invention.

An embodiment of the invention can be implemented as computer software in the form of computer readable code executed in a general purpose computing environment such as environment 700 illustrated in FIG. 7, or in the form of bytecode class files running in such an environment. A keyboard 710 and mouse 711 are coupled to a bidirectional system bus 718. The keyboard and mouse are for introducing user input to a computer 701 and communicating that user input to processor 713.

Computer 701 may also include a communication interface 720 coupled to bus 718. Communication interface 720 provides a two-way data communication coupling via a network link 721 to a local network 722. For example, if communication interface 720 is an integrated services digital network (ISDN) card or a modem, communication interface 720 provides a data communication connection to the corresponding type of telephone line, which comprises part of network link 721. If communication interface 720 is a local area network (LAN) card, communication interface 720 provides a data communication connection via network link 721 to a compatible LAN. Wireless links are also possible. In any such implementation, communication interface 720 sends and receives electrical, electromagnetic or optical signals which carry digital data streams representing various types of information.

Network link 721 typically provides data communication through one or more networks to other data devices. For example, network link 721 may provide a connection through local network 722 to local server computer 723 or to data equipment operated by ISP 724. ISP 724 in turn provides data communication services through the world wide packet data communication network now commonly referred to as the "Internet" 725. Local network 722 and Internet 725 both use electrical, electromagnetic or optical signals which carry digital data streams. The signals through the various networks and the signals on network link 721 and through communication interface 720, which carry the digital data to and from computer 700, are exemplary forms of carrier waves transporting the information.

Processor 713 may reside wholly on client computer 701 or wholly on server 726 or processor 713 may have its computational power distributed between computer 701 and server 726. In the case where processor 713 resides wholly on server 726, the results of the computations performed by processor 713 are transmitted to computer 701 via Internet 725, Internet Service Provider (ISP) 724, local network 722 and communication interface 720. In this way, computer 701 is able to display the results of the computation to a user in the form of output. Other suitable input devices maybe used in addition to, or in place of, the mouse 711 and keyboard 710. I/O (input/output) unit 719 coupled to bidirectional system bus 718 represents such I/O elements as a printer, A/V (audio/video) I/O, etc.

Computer 701 includes a video memory 714, memory 715 and mass storage 712, all coupled to bi-directional system bus 718 along with keyboard 710, mouse 711 and processor 713. As with processor 713, in various computing environments, main memory 715 and mass storage 712, can reside wholly on server 726 or computer 701, or they may be distributed between the two. Examples of systems where processor 713, main memory 715, and mass storage 712 are distributed between computer 701 and server 726 include the thin-client computing architecture developed by Sun Microsystems, Inc., the palm pilot computing device, Internet ready cellular phones, and other Internet computing devices.

The mass storage 712 may include both fixed and removable media, such as magnetic, optical or magnetic optical storage systems or any other available mass storage technology. Bus 718 may contain, for example, thirty-two address lines for addressing video memory 714 or main memory 715. The system bus 718 also includes, for example, a 32-bit data bus for transferring data between and among the components, such as processor 713, main memory 715, video memory 714 and mass storage 712. Alternatively, multiplex data/address lines may be used instead of separate data and address lines.

In one embodiment of the invention, the processor 713 is a microprocessor manufactured by Motorola, such as the 680X0 processor or a microprocessor manufactured by Intel, such as the 80X86, or Pentium processor, or a SPARC microprocessor from Sun Microsystems, Inc. However, any other suitable microprocessor or microcomputer maybe utilized. Main memory 715 is comprised of dynamic random access memory (DRAM). Video memory 714 is a dual-ported video random access memory. One port of the video memory 714 is coupled to video amplifier 716. The video amplifier 716 is used to drive the cathode ray tube (CRT) raster monitor 717. Video amplifier 716 is well known in the art and maybe implemented by any suitable apparatus. This circuitry converts pixel data stored in video memory 714 to a raster signal suitable for use by monitor 717. Monitor 717 is a type of monitor suitable for displaying graphic images.

Computer 701 can send messages and receive data, including program code, through the network(s), network link 721, and communication interface 720. In the Internet example, remote server computer 726 might transmit a requested code for an application program through Internet 725, ISP 724, local network 722 and communication interface 720. The received code maybe executed by processor 713 as it is received, and/or stored in mass storage 712, or other non-volatile storage for later execution. In this manner, computer 700 may obtain application code in the form of a carrier wave. Alternatively, remote server computer 726 may execute applications using processor 713, and utilize mass storage 712, and/or video memory 715. The results of the execution at server 726 are then transmitted through Internet 725, ISP 724, local network 722 and communication interface 720. In this example, computer 701 performs only input and output functions.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

Thus, object cache eviction using a variable budget is described in conjunction with one or more specific embodiments. The invention is defined by the claims and their full scope of equivalents.

What is claimed is:

1. A method for determining a budget for persistent objects in an object cache in a persistent system, wherein said budget is used to partition said object cache between transient and persistent regions that grow or shrink based upon feedback from other parts of the system, comprising:
   obtaining a plurality of persistent objects;
   determining said budget;
   using said budget to partition said object cache between transient and persistent regions; and
   evicting a member of said plurality of persistent objects from said object cache, when said plurality of persistent objects exceed said budget.

2. The method of claim 1, wherein said step of determining said budget further comprises:
   increasing said budget when a rate at which said persistent objects are being faulted in is high.

3. The method of claim 1, wherein said step of determining said budget further comprises:
   decreasing said budget when a rate at which one or more transient objects are allocated is high.

4. The method of claim 1, wherein said step of determining said budget further comprises:
   decreasing said budget when a rate at which garbage collection is occurring is high.

5. The method of claim 1, wherein said step of evicting further comprises:
   applying a second chance tagging scheme.

6. The method of claim 1, wherein said step of evicting further comprises:
   applying a random eviction scheme.

7. The method of claim 1, wherein said persistent objects are objects created in a platform independent programming language.

8. The method of claim 1, wherein said step of obtaining further comprises:
   combining a heap and an object cache.

9. An object cache sizing system that uses a budget to partition an object cache between transient and persistent regions that grow or shrink based upon feedback from other parts of the system, comprising:
   a plurality of persistent objects;
   said budget; and
   an evictor configured to evict a member of said plurality of persistent objects from said object cache, when said plurality of persistent objects exceed said budget.

10. The system of claim 9, wherein said budget is increased when a rate at which said persistent objects are being faulted in is high.

11. The system of claim 9, wherein said budget is decreased when a rate at which one or more transient objects are allocated is high.

12. The system of claim 9, wherein said budget is decreased when a rate at which garbage collection is occurring is high.

13. The system of claim 9, wherein said evictor is configured to apply a second chance tagging scheme.

14. The system of claim 9, wherein said evictor is configured to apply a random eviction scheme.

15. The system of claim 9, wherein said persistent objects are objects created in a platform independent programming language.

16. The system of claim 9, wherein said plurality of persistent objects are obtained from a combined heap and object cache.

17. A computer program product comprising:
   a computer usable medium having computer readable program code embodied therein configured to determine a budget for persistent objects in an object cache in a persistent system, wherein said budget is used to partition said object cache between transient and persistent regions that grow or shrink based upon feedback from other parts of the system, said computer program product comprising:
      computer readable code configured to cause a computer to obtain a plurality of persistent objects;
      computer readable code configured to cause a computer to determine said budget;
      computer readable code configured to use said budget to partition said object cache between transient and persistent regions; and
      computer readable code configured to cause a computer to evict a member of said plurality of persistent objects, when said plurality of persistent objects exceed said budget.

18. The computer program product of claim 17, wherein said computer readable code configured to cause a computer to determine said budget further comprises:

computer readable code configured to cause a computer to increase said budget when a rate at which persistent objects are being faulted in is high.

19. The computer program product of claim 17, wherein said computer readable code configured to cause a computer to determine said budget further comprises:

computer readable code configured to cause a computer to decrease said budget when a rate at which one or more transient objects are allocated is high.

20. The computer program product of claim 17, wherein said computer readable code configured to cause a computer to determine said budget further comprises:

computer readable code configured to cause a computer to decrease said budget when a rate at which garbage collection is occurring is high.

21. The computer program product of claim 17, wherein said computer readable code configured to cause a computer to evict further comprises:

computer readable code configured to cause a computer to apply a second chance tagging scheme.

22. The computer program product of claim 17, wherein said computer readable code configured to cause a computer to evict further comprises:

computer readable code to configured to cause a computer to apply a random eviction scheme.

23. The computer program product of claim 17, wherein said persistent objects are objects created in a platform independent programming language.

24. The computer program product of claim 17, wherein said persistent objects are obtained from a combined heap and object cache.

\* \* \* \* \*